United States Patent Office 2,819,239
Patented Jan. 7, 1958

2,819,239

PORTLAND CEMENT-VINYLIDENE CHLORIDE POLYMER COMPOSITION, METHOD OF MAKING, AND METHOD OF USING

John F. Eberhard and Arthur Park, Tulsa, Okla., assignors to The Dow Chemical Company, Midland, Mich., a corporation of Delaware No Drawing. Application December 6, 1955
Serial No. 551,242

7 Claims. (Cl. 260—29.6)

The invention relates to cementing in wells drilled into the earth. It more particularly relates to an improved composition for and method of sealing the annular space between the wall of a well hole in the earth and a casing therein placed.

In boring into the earth for oil, gas, water or brine, it is usually desirable to case the bore hole with a pipe preferably of steel. The successful fulfillment of the desired functions of a casing in a well hole mainly depends upon whether or not the space between the bore wall and the outside of the casing can be tightly sealed. Heretofore, the almost universal practice of attempting to seal a casing in a well hole has been to inject a slurry of Portland cement in water into the annular space between the casing and the well hole. Although adequate seals are at times obtained, nevertheless numerous difficulties arise in the conventional cementing practice which militate against achieving the desired objectives of a well cementing operation. One of the difficulties is that the cement fails to bond to earth formations which are oil-wet, brine-wet, or mudded. Because of this, it is difficult or impossible to make a good seal in the bottom of a well as in plugging off bottom hole water where no casing may exist. For the same reason, good casing seals may not be obtained. Still another difficulty encountered in cementing wells with Portland cement is that the conventional slurry, on being put under pressure in the annular space outside the casing as when attempting to cement it in place, loses water by the filtering action of the earth formation. This results in the slurry losing its ability to flow into place and premature setting results. Another difficulty is that conventionally cemented casing in a well hole does not perforate cleanly and without cracking or shattering in the vicinity of the perforation. This is disadvantageous in a well having a casing traversing for example a producing oil or gas zone adjacent to a water zone which is to be sealed off while obtaining production from the oil or gas zone. In such a situation, perforating the casing opposite the oil or gas zone may result in unwanted water entering the well. Conventional Portland cement set in wells also does not strongly resist premature destruction by natural brines when these contain soluble sulfates.

In view of the various difficulties and problems of conventional well cementing operations, it is a desideratum in the art to provide an improved cementing method. Accordingly, it is the principal object of the invention to provide an improved well cementing method which overcomes many of the difficulties inherent in the conventional well cementing operations using Portland cement. Other objects and advantages will appear as the description of the invention proceeds.

Among the discoveries on which the present invention is based is that by including in the Portland cement slurry, normally used in a well cementing operation, an appropriate amount, as herein shown, of a latex of a vinylidene chloride copolymer of the group consisting of vinylidene chloride copolymerized with from 5 to 95 parts of acrylonitrile per 100 parts of the copolymer, vinylidene chloride copolymerized with from 5 to 95 parts of vinyl chloride per 100 parts of the copolymer, and vinylidene chloride copolymerized with from 5 to 95 parts of vinyl acetate per 100 parts of the copolymer, the particles of the copolymer in the latex having a diameter of from 1800 to 5000 angstroms (preferably 1800 to 2500 A.), together with a nonionic wetting agent in amount from 0.4 to 5.6 percent of the dry weight of the cement, many of the difficulties encountered in the conventional well cementing operations are overcome. The invention then consists of the improved method of cementing particularly against an earth formation with a settable Portland cement slurry herein fully described and particularly pointed out in the claims.

In carrying out the invention, the latex, which normally comprises from 5 to 55 percent by weight of the vinylidene chloride copolymer, and from about 1 to 2 percent of the conventional emulsifier (e. g. sodium lauryl sulfate, sodium myristyl sulfate) used in making the latex, the balance being water, is mixed with the requisite amount of Portland cement for the work in hand together with the nonionic wetting agent and additional water to form a settable cement slurry. Sufficient latex is used to provide in the slurry from 2.5 to 35.2 pounds latex solids per 100 pounds of the dry cement. A preferred proportion of latex solids is 3.1 to 11.25 percent of the weight of the cement in the slurry. Mixing may be accomplished in a conventional cement mixer. The mixer may be charged with most of the water required and then the cement may be added. The mixing of the water and cement is continued until a smooth slurry is obtained. Then a nonionic wetting agent is added and mixing continued until uniformly blended into the cement slurry. The amount of wetting agent may range from 0.4 to 5.6 percent of the weight of the dry cement, a preferred proportion is from 0.52 to 1.7 percent of the weight of the dry cement. Thereafter, the requisite amount of latex is added followed by further mixing until a completely homogeneous slurry is obtained. The water requirement is dependent upon the amount needed to form a settable slurry of the cement and will range from a minimum of about 25 to a maximum of about 41 percent of the weight of the entire mixture, the water including that present in the latex. A preferred amount of water in the entire mixture is from about 28 to 35 percent by weight.

Any of the Portland cements may be used, as for example, any of ASTM types I, II, III, and IV. (See ASTM Standards 1952, Part 3, pages 1 to 5, inclusive, ASTM designation C150–152.)

The following is an example of the practice of the invention.

EXAMPLE

A 9 inch diameter well, that was drilled to a depth of 3442 feet and cased with 7 inch pipe to a depth of 3412 feet, had 30 feet of open hole below the casing, the lower 17 feet of which produced water. This water producing section of the well was cemented off by a plug of cement in accordance with the invention. In plugging off the section, 40 gallons (333.6 lbs.) of water and 8 sacks of Portland cement (752 lbs. ASTM Type I) were mixed together in a cement mixer until a smooth slurry was obtained. To the slurry thus obtained was added 0.5 gallon of wetting agent of a polyglycol (4.4 lbs. of "Igepal 630" i. e. nonyl phenol condensed with 10 to 12 moles of ethylene oxide). Agitation was continued until the wetting agent was dispersed in the slurry. Next 4.5 gallons of a latex of a copolymer of vinylidene chloride, 85 percent, and acrylonitrile, 1.5 percent (comprising 22.5 lbs. of copolymer solids and 22.5 lbs. of water) were added to the slurry and the slurry was agitated for 15 minutes, thereby producing a uniform mixture of cement, wetting agent, water, and latex. The mixture thus obtained weighed 1135 pounds. 60 gallons of the latex-cement mixture thus obtained were placed in the bottom of the well to form a plug therein by means of six trips with a dump bailer of about 10 gallons capacity. The slurry thus placed in the well was submerged under a static column of water extending approximately 2000 feet above the latex-cement mixture in the well. 15 hours later, by sounding methods, it was determined that a solid plug of cement 16 feet in length had been formed in the bottom of the hole by the foregoing procedure. From this sounding, it was determined that an additional quantity of the latex-cement slurry was needed to make the plug sufficiently long to cover the water producing section. An additional quantity of the same slurry was then deposited upon the top of the plug to a depth sufficient to give an overall fill-up of 18 feet and the well was then left undisturbed for 72 hours. The set plug thus obtained held back the water from entering the well. As a further test of the strength of the plug, the well was subjected to a hydraulic fracturing treatment known commercially as "Sandfrac" in which a slurry of sand in oil was injected through the well casing into the earth above the plug at high pressure. This was accomplished without difficulty, thereby indicating that the set latex-cement plug held firmly without leakage.

In Table I are data based upon a series of tests which illustrate the effect of varying the proportion of latex on the compressive strength of set Portland cement. In this series of tests a latex was used of the copolymer of vinylidene chloride, 85 percent, and acrylonitrile, 15 percent. The latex contained 50 percent by weight of the copolymer, the balance being water and about 1.5 percent of emulsifier used in making the latex. In each test 200 grams of Portland cement was mixed with the tabulated amount of water and 1 milliliter of a nonionic wetting agent (Igepal 630).

agents within the scope of the invention. Examples of other suitable wetting agents are: (A) The condensation product of diethylene triamine (1 mole) with propylene oxide (23 moles) and ethylene oxide (10 moles); (B) the condensation product of propylene glycol (1 mole) with ethylene oxide (34 moles); (C) the condensation product of phenol (1 mole) with propylene oxide (8 moles) and ethylene oxide (16 moles); and (D) the condensation product of nonyl phenol (1 mole) with ethylene oxide (10 moles).

Tests made to compare the strength of the bond obtained between oil wet sandstone (a typical oil-bearing formation) and the cement formulated as above and set against the sandstone indicates that the bond has four times the strength of that of the same cement but without the latex and wetting agent additions.

The latex-cement mixtures compounded in accordance with the invention resist loss of water by filtration and remain pumpable under conditions in which ordinary Portland cements lose water and become unpumpable. For example in a standard fluid loss test using 600 cc. of cement slurry, a Whatman #52 filter paper and 100 p. s. i. according to the API Code 29, a standard Portland cement slurry, in the proportions of 94 pounds of cement and 5.4 gallons of water, all the water filtered out in 3 minutes leaving the cement dry and solid on the filter paper. In comparison the latex-cement mixture formulated as above, in accordance with the invention, and submitted to the same test stopped losing water by filtration after 50 milliliters were lost and the remaining unfiltered slurry was still fluid and pumpable.

The latex-cement slurries formulated in accordance with the invention tolerate considerable contamination by drilling muds. For example tests were made with a latex-cement slurry formed by mixing together 200 grams of Portland cement (ASTM Type I), 1 gram of wetting agent (Igepal 630), 14.4 grams of latex (the latex was composed of the copolymer of 85 parts of vinylidene chloride and 15 parts of acrylonitrile dispersed in an equal weight of water), and 90 cc. of additional water. In the Table I

| Test No. | Latex | | | Ml. Water Added | Ratios | | Compressive Strength in p. s. i. |
|---|---|---|---|---|---|---|---|
| | Ml. Used | Grams of Copolymer in Latex | Latex Solids, Weight Percent [1] | | Total Gal. Water Per Sack [2] of Cement | Total Pounds Solids Per Gal. Water | |
| 1 | 0 | | | | 5.4 | 17.4 | 550 |
| 2 | 12 | 7.2 | 3.5 | 96 | 5.48 | 17.7 | 650 |
| 3 | 28 | 16.8 | 8.4 | 82 | 5.56 | 18.2 | 630 |
| 4 | 80 | 48 | 24 | 56 | 5.86 | 19.0 | 630 |
| 5 | 120 | 72 | 36 | 36 | 6.08 | 19.6 | 315 |

[1] Based upon weight of dry Portland cement.
[2] 94 pounds.

From the foregoing data, it is manifest that the addition of the copolymer (solids) to the cement slurry at least in the range of 3.5 percent to the weight of the cement in the slurry enhances the strength of the set cement.

The proportion of nonionic wetting agent included in the slurry must exceed a critical minimum of 0.4 percent. In amounts below the minimum, the cement separates and coagulates. In amounts beyond this and up to 1 percent, the strength of the cement is sharply increased. Beyond 1 percent, the strength declines slowly but improvement persists with up to about 5.6 of the wetting agent. For example, in a slurry mix formed of 200 grams of Portland cement and 14.4 grams of the latex used in the tests of Table I, 0.5 percent of the same wetting agent and 90 milliliters of added water, the compressive strength of the cement when set was 650 p. s. i.; with 1 percent the compressive strength was 1000 p. s. i.; with 3 percent 820 p. s. i.; and with 6 percent 630 p. s. i. Similar results were obtained in similar tests with other latices and wetting test 14 grams of drilling mud composed of bentonite, water, and quebracho were mixed with 130 grams of the above latex by folding the mud and cement slurry together so as to simulate the mixing which occurs in a well on pumping a cement slurry behind well casing in a mudded well hole. After such mixing cylindrical specimens of the mixture 2 inches in diameter and 2 inches high were cast, cured at 80° F. for 72 hours, and then their compressive strengths determined. The average compressive strength thus obtained was 2257 p. s. i. For comparison the same Portland cement was slurried with water in the same proportions but without latex and wetting agent and folded with the same drilling mud in the same proportions and test specimens were similarly made. These had a compressive strength of 1750 p. s. i.

Among the advantages of the invention are that the cement of the slurry bonds to oil-wet, brine-wet, and mudded well hole walls; the set cement is resistant to attack by sulfate waters; the set cement resists shattering and cracking when perforating well casing cemented by the method; the cement slurry has improved tolerance for contamination by well drilling mud without loss of strength or ability to set; the slurry can be pumped more readily into the annular space between a well hole wall and a casing in the well because the rate of setting is slower and fluid loss by filtration is checked.

We claim:

1. A composition for cementing which comprises a slurry of Portland cement, a latex of a vinylidene chloride copolymer selected from the group consisting of a copolymer of vinylidene chloride and acrylonitrile in the proportions of 70 to 97 percent by weight of vinylidene chloride, the balance being acrylonitrile, a copolymer of vinylidene chloride and vinyl chloride in the proportions of 95 to 5 percent of vinylidene chloride, the balance being vinyl chloride, and a copolymer of vinylidene chloride and vinyl acetate in the proportions of 95 to 5 percent of vinylidene chloride, the balance being vinyl acetate, the amount of copolymer being from 2.5 to 35.2 percent of the weight of the cement, the particles of said copolymer having a diameter of from 1800 to 5000 angstroms, a nonionic wetting agent in amount between 0.4 and 5.6 percent of the weight of the cement, and water in amount between about 25 to 41 percent of the weight of the composition.

2. A composition according to claim 1 in which the vinylidene chloride copolymer is vinylidene chloride copolymerized with from 5 to 95 parts of acrylonitrile per 100 parts of the copolymer.

3. The method of making a cementing slurry comprising Portland cement which comprises mixing together the Portland cement and a portion of the water required for its hydration until a smooth slurry is obtained, blending into the slurry so-obtained an amount of a nonionic wetting agent equal to from 0.4 to 5.6 percent of the weight of the cement, mixing with the slurry so-obtained a latex of a vinylidene chloride copolymer of the group consisting of vinylidene chloride copolymerized with from 5 to 95 parts of acrylonitrile per 100 parts of the copolymer, vinylidene chloride copolymerized with 5 to 95 parts of vinyl chloride per 100 parts of the copolymer, and vinylidene chloride copolymerized with from 5 to 95 parts of vinyl acetate per 100 parts of the copolymer, the particles of the copolymer in the latex having a diameter of from 1800 to 2500 angstroms, said latex comprising from 5 to 55 percent of water, the balance being copolymer solids with about 1 to 2 parts of latex emulsifier per 100 parts of latex, the amount of copolymer solids added to the slurry being from 2.5 to 35.2 percent of the weight of the cement, the portion of the water first added and the water present in the latex together being from 25 to 41 percent of the weight of the slurry.

4. A method of cementing in a well formed in the earth which comprises depositing therein a flowable slurry comprising Portland cement, and a latex of a vinylidene chloride copolymer selected from the group consisting of a copolymer of vinylidene chloride and acrylonitrile in the proportions of 70 to 97 percent by weight of vinylidene chloride the balance being acrylonitrile, copolymer of a vinylidene chloride and vinyl chloride in the proportions of 95 to 5 percent of vinylidene chloride the balance being vinyl chloride, and a copolymer of vinylidene chloride and vinyl acetate in the proportions of 95 to 5 percent of vinylidene chloride, the balance being vinyl acetate, the amount of said copolymer being from 2.5 to 35.2 percent of the weight of the cement, the particles of said copolymer having a diameter of from 1800 to 5000 angstroms, a nonionic wetting agent in amount between 0.4 and 5.6 percent of the weight of the cement, and water in amount between about 25 and 41 percent of the weight of the entire slurry.

5. A method of cementing according to claim 4 in which the slurry is introduced into the annular space between the well wall and a casing set in the well.

6. A method according to claim 4 in which the amount of the copolymer is from 3.1 to 11.25 percent of the weight of the cement.

7. A method of cementing according to claim 6 in which the slurry is introduced into the annular space between the well wall and a casing set in the well.

References Cited in the file of this patent

UNITED STATES PATENTS 2,662,064    Mead _____ Dec. 8, 1953

FOREIGN PATENTS 1,019,640    France _____ Nov. 5, 1952